United States Patent
Yu et al.

(10) Patent No.: US 12,243,117 B2
(45) Date of Patent: *Mar. 4, 2025

(54) POST-DETECTION REFINEMENT BASED ON EDGES AND MULTI-DIMENSIONAL CORNERS

(71) Applicant: MUJIN, Inc., Tokyo (JP)

(72) Inventors: Jinze Yu, Tokyo (JP); Jose Jeronimo Moreira Rodrigues, Tokyo (JP)

(73) Assignee: Mujin, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,521

(22) Filed: Nov. 15, 2023

(65) Prior Publication Data

US 2024/0157566 A1 May 16, 2024

Related U.S. Application Data

(63) Continuation of application No. 17/806,379, filed on Jun. 10, 2022, now Pat. No. 11,850,760, which is a
(Continued)

(51) Int. Cl.
*G06T 1/00* (2006.01)
*B25J 9/16* (2006.01)
(Continued)

(52) U.S. Cl.
CPC .......... *G06T 1/0014* (2013.01); *B25J 9/1697* (2013.01); *B25J 19/023* (2013.01); *B65G 61/00* (2013.01);
(Continued)

(58) Field of Classification Search
CPC ...... B25J 9/1697; B25J 19/023; B25J 9/1687; B65G 61/00; B65G 2201/025;
(Continued)

(56) References Cited

U.S. PATENT DOCUMENTS 9,102,055 B1 * 8/2015 Konolige ............... B25J 9/1612
9,424,461 B1 * 8/2016 Yuan ..................... G06V 20/647
(Continued)

FOREIGN PATENT DOCUMENTS

CN 101907459 A 12/2010
CN 102128589 A 7/2011
(Continued)

OTHER PUBLICATIONS

CNIPA Notice to Grant for Chinese patent application No. 202010445828.3 mailed Jun. 10, 2021, 5 pages.
(Continued)

*Primary Examiner* — Thomas Randazzo
(74) *Attorney, Agent, or Firm* — Perkins Coie LLP

(57) ABSTRACT

The present disclosure relates to verifying an initial object estimation of an object. A two-dimensional (2D) image representative of an environment including one or more objects may be obtained. The 2D image may be inspected to detect edges of an object. The edges may be processed to verify or update an initial object estimation to increase the accuracy of an object detection result.

20 Claims, 9 Drawing Sheets

Related U.S. Application Data continuation of application No. 16/824,680, filed on Mar. 19, 2020, now Pat. No. 11,389,965.

(60) Provisional application No. 62/879,359, filed on Jul. 26, 2019.

(51) Int. Cl.

| | | |
|---|---|---|
| *B25J 19/02* | (2006.01) | |
| *B65G 61/00* | (2006.01) | |
| *G06F 18/23* | (2023.01) | |
| *G06T 7/13* | (2017.01) | |
| *G06T 7/174* | (2017.01) | |
| *G06T 7/33* | (2017.01) | |
| *G06T 7/73* | (2017.01) | |
| *G06V 10/44* | (2022.01) | |
| *G06V 20/52* | (2022.01) | |
| *G06V 20/64* | (2022.01) | |

(52) U.S. Cl.
CPC .............. *G06F 18/23* (2023.01); *G06T 7/13* (2017.01); *G06T 7/174* (2017.01); *G06T 7/33* (2017.01); *G06T 7/73* (2017.01); *G06V 10/443* (2022.01); *G06V 10/457* (2022.01); *G06V 20/52* (2022.01); *G06V 20/647* (2022.01); *B65G 2201/025* (2013.01); *G06T 2207/20212* (2013.01)

(58) Field of Classification Search
CPC ...... B65G 2203/0233; B65G 2203/041; B65G 57/03; G06F 18/23; G06T 1/0014; G06T 7/13; G06T 7/174; G06T 7/33; G06T 7/73; G06T 2207/20212; G06T 2207/10028; G06V 10/443; G06V 10/457; G06V 20/52; G06V 20/647; G06V 10/44; G06V 10/98; G06V 20/58; G06V 2201/06; G06V 20/20; G06V 10/751; G05B 2219/40006; G05B 2219/45056
See application file for complete search history.

(56) References Cited

U.S. PATENT DOCUMENTS

| | | | | |
|---|---|---|---|---|
| 10,369,701 | B1* | 8/2019 | Diankov | B65G 61/00 |
| 11,389,965 | B2* | 7/2022 | Yu | B25J 19/023 |
| 11,850,760 | B2* | 12/2023 | Yu | G06V 10/44 |
| 2002/0050988 | A1 | 5/2002 | Petrov et al. | |
| 2006/0056732 | A1* | 3/2006 | Holmes | G06T 7/13 |
| | | | | 382/286 |
| 2009/0091566 | A1* | 4/2009 | Turney | G06T 7/33 |
| | | | | 382/128 |
| 2012/0262455 | A1* | 10/2012 | Watanabe | G06T 7/75 |
| | | | | 345/420 |
| 2013/0230235 | A1 | 9/2013 | Tateno et al. | |
| 2014/0049535 | A1 | 2/2014 | Wang et al. | |
| 2015/0269438 | A1* | 9/2015 | Samarasekera | G01C 21/3848 |
| | | | | 382/154 |
| 2016/0042517 | A1* | 2/2016 | Hunt | G06V 20/10 |
| | | | | 382/141 |
| 2016/0110840 | A1* | 4/2016 | Odagiri | G06T 7/74 |
| | | | | 382/199 |
| 2016/0155235 | A1 | 6/2016 | Miyatani et al. | |
| 2017/0220887 | A1* | 8/2017 | Fathi | G06V 20/70 |
| 2019/0114777 | A1 | 4/2019 | Maity et al. | |
| 2019/0143523 | A1* | 5/2019 | Harel | G06F 18/23 |
| | | | | 700/259 |
| 2020/0134830 | A1* | 4/2020 | Yu | B65G 61/00 |
| 2020/0302207 | A1* | 9/2020 | Perkins | G06V 10/764 |
| 2021/0299878 | A1* | 9/2021 | Konishi | B25J 9/163 |

FOREIGN PATENT DOCUMENTS

| | | | |
|---|---|---|---|
| CN | 102890823 | A | 1/2013 |
| CN | 104075659 | A | 10/2014 |
| CN | 104424475 | A | 3/2015 |
| CN | 104841593 | A | 8/2015 |
| CN | 104842361 | A | 8/2015 |
| CN | 105654464 | A | 6/2016 |
| CN | 105654465 | A | 6/2016 |
| CN | 103155003 | A | 9/2016 |
| CN | 106056598 | A | 10/2016 |
| CN | 107729893 | A | 2/2018 |
| CN | 108724190 | A | 11/2018 |
| CN | 108920996 | A | 11/2018 |
| CN | 109559324 | A | 4/2019 |
| CN | 110243308 | A | 9/2019 |
| JP | 2001317911 | A | 11/2001 |
| JP | 2003172605 | A | 6/2003 |
| JP | 2012123781 | A | 6/2012 |
| JP | 2013101045 | A | 5/2013 |
| JP | 2015090298 | A | 5/2015 |
| WO | 2000057129 | A1 | 9/2000 |

OTHER PUBLICATIONS

CNIPA Office Action for Chinese patent application No. 202010445828.3 mailed Mar. 16, 2021, 13 pages.
Japan Patent Office, Decision to Grant for Japanese patent application No. 2020-077289 mailed Jul. 9, 2020, 3 pages.
Japan Patent Office, Notice of Reasons for Rejection for Japanese patent application No. 2020- 077289 mailed Jun. 1, 2020, 7 pages.
Notice of Allowance mailed Mar. 21, 2022 for U.S. Appl. No. 16/824,680, filed Mar. 29, 2020, First Inventor: Jinze Yu, 10 pages.
Notice of Allowance mailed Apr. 22, 2022 for U.S. Appl. No. 16/824,680, filed Mar. 29, 2020, First Inventor: Jinze Yu, 10 pages.
Notice of Allowance mailed Aug. 15, 2023 for U.S. Appl. No. 17/806,379, filed Jun. 10, 2022, First Inventor: Jinze Yu, 9 pages.
JPO Office Action mailed Sep. 26, 2024 for patent application No. 2020132160, 4 pages.
JPO Office Action mailed Mar. 1, 2024 for patent application No. 2020132160, 4 pages.

\* cited by examiner

POST-DETECTION REFINEMENT BASED ON EDGES AND MULTI-DIMENSIONAL CORNERS

CROSS-REFERENCE TO RELATED APPLICATION(S)

This application is a continuation of U.S. patent application Ser. No. 17/806,379 filed Jun. 10, 2022, now allowed, which is a continuation of U.S. patent application Ser. No. 16/824,680 filed Mar. 19, 2020, issued as U.S. Pat. No. 11,389,965 on Jul. 19, 2022, which claims the benefit of U.S. Provisional Patent Application No. 62/879,359 filed Jul. 26, 2019, all of which are incorporated herein by reference in their entireties.

TECHNICAL FIELD

The present technology is directed generally to robotic systems and, more specifically, to systems, processes, and techniques for refining detection results.

BACKGROUND

In many cases, packages arranged in pallets (or ""palletized"") for shipment to a destination, where the packages are subsequently de-palletized at the destination. Packages may be de-palletized by human workers, which can be resource-intensive and increase the risk of injury to the human workers. In industrial settings, de-palletizing operations may be performed by industrial robots, such as a robotic arm that grip, lift, transport, and deliver the package to a release point. Also, an imaging device may be utilized to capture an image of a stack of packages loaded on the pallet. A system may process the image to ensure the package is efficiently handled by the robotic arm, such as by comparing the captured image with a registered image stored in a registration data source.

On occasion, the captured image of a package may match a registered image. As a result, physical characteristics (e.g., measurements of a package's dimensions, weight, and/or center of mass) of the imaged objects may be unknown erroneously represented, and/or fail to match predetermined or template data. Failure to correctly identify the physical characteristics can lead to a variety of unwanted outcomes. For example, such failure could cause a stoppage, which may require manual registration of the package. Also, such failure could result in a package being mishandled, especially if the package is relatively heavy and/or lop-sided.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
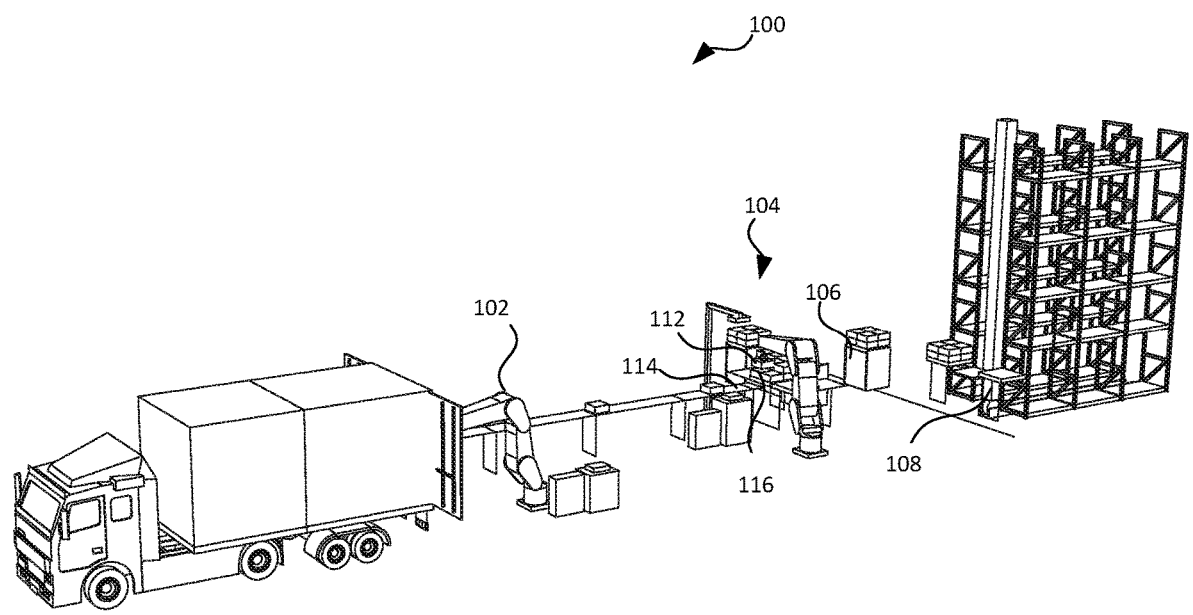
FIG. 1 is an illustration of an example environment in which a robotic system with a post-detection refinement registration mechanism may operate.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Systems and methods for robotic systems with post-detection refinement mechanisms are described herein. A robotic system (e.g., an integrated system of devices that executes one or more designated tasks) configured in accordance with some embodiments provides enhanced usability and flexibility by refining or adjusting object detection results based on characteristics captured in two-dimensional (2D) and/or three-dimensional (3D) image data, such as edges or corners.

To determine whether objects are recognized, the robotic system can obtain and compare the image data regarding objects at a start location (e.g., one or more images of exposed surfaces of the objects) to registration data for known or expected objects. The robotic system can determine an object as being recognized when the compared data (e.g., a portion of the compared image) matches registration data (e.g., one of the registered surface images) for one of the objects. The robotic system can detect the object by concluding that a recognized object exists at a particular location within the imaged area. Accordingly, the robotic system can generate detection results that represent the recognized objects and/or locations of the recognized objects.

In many cases, determining a position/orientation of an object (e.g., a box arranged on a pallet) may include using pre-determined/stored object templates (e.g., visual images of the object surface) with surface marking/designs. However, reliance on such pre-determined/stored object templates for identification of objects may result in inaccurate results for the actual position/location of the objects in the real world.

For example, the actual surface marking/designs on an object/box may be off-set, distorted, or at a different orientation relative to those in the pre-determined/stored object templates. In other words, the captured images may have inaccurate representations of the surface markings/designs due to computer vision errors and/or the processed objects may have the actual surface markings/designs that are offset or different than the intended or template image, such as due to manufacturing errors."

The different types of errors regarding the captured surface appearance can lead to determining that the object is at a position/orientation that is different from its actual position/orientation in the real world (e.g., on a storage location/pallet). The inaccurate position/location determination of an object can further lead to errors or failures manipulation of the object in a subsequent action, such as due to gripping the object away from a center-of-mass (CoM) location in transferring the object.

Accordingly, the present embodiments may implement a pairwise edge analysis to identify offsets/alignment errors between an initial object estimation and detected features of the object. Based on any detected offset/alignment error, the initial object estimation may be updated or verified in finalizing the object detection. Verification and/or updating of the initial object estimation may increase accuracy position/location of the object.

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or processor-executable instructions, including routines executed by a programmable computer or processor. Those skilled in the relevant art will appreciate that the disclosed techniques can be practiced on computer or processor systems other than those shown and described below. The techniques described herein can be embodied in a special-purpose computer or data processor that is specifically programmed, configured, or constructed to execute one or more of the computer-executable instructions described below. Accordingly, the terms "computer" and "processor" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and processors can be presented at any suitable display medium, including a liquid crystal display (LCD). Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

Suitable Environments

FIG. 1 is an illustration of an example environment in which a robotic system 100 with a post-detection refinement mechanism may operate. The robotic system 100 can include and/or communicate with one or more units (e.g., robots) configured to execute one or more tasks. Aspects of the post-detection refinement mechanism can be practiced or implemented by the various units.

For the example illustrated in FIG. 1, the robotic system 100 can include an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. For another example, the task can include placing the objects on a target location (e.g., on top of a pallet and/or inside a bin/cage/box/case). As described below, the robotic system can derive plans (e.g., placement locations/orientations, sequence for transferring the objects, and/or corresponding motion plans) for placing and/or stacking the objects. Each of the units can be configured to execute a sequence of actions (e.g., operating one or more components therein) to execute a task.

In some embodiments, the task can include manipulation (e.g., moving and/or reorienting) of a target object 112 (e.g., one of the packages, boxes, cases, cages, pallets, etc. corresponding to the executing task) from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (by, e.g., moving the pallet carrying the target object 112) from the transfer unit 104 to a storage location (e.g., a location on the shelves). Details regarding the task and the associated data processing are described below.

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include transport motors configured to transport the corresponding units/chassis from place to place.

The robotic system 100 can include sensors configured to obtain information used to detect the objects and/or implement the tasks, such as for manipulating the structural members and/or for transporting the robotic units. The sensors can include devices configured to detect or measure one or more physical properties of the robotic system 100 (e.g., a state, a condition, and/or a location of one or more structural members/joints thereof) and/or of a surrounding environment. Some examples of the sensors can include accelerometers, gyroscopes, force sensors, strain gauges, tactile sensors, torque sensors, position encoders, etc.

In some embodiments, for example, the sensors can include one or more imaging devices (e.g., visual and/or infrared cameras, 2D and/or 3D imaging cameras, distance measuring devices such as lidars or radars, etc.) configured to detect the surrounding environment. The imaging devices can generate representations of the detected environment, such as digital images and/or point clouds, that may be processed via machine/computer vision (e.g., for automatic inspection, robot guidance, or other robotic applications). As described in further detail below, the robotic system 100 can process the digital image and/or the point cloud to identify the target object 112, the start location 114, the task location 116, a pose of the target object 112, a confidence measure regarding the start location 114 and/or the pose, or a combination thereof.

For manipulating the target object 112, the robotic system 100 can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices can include one or more cameras configured to generate images of the pickup area and/or one or more cameras configured to generate images of the task area (e.g., drop area). Based on the captured images, as described in detail below, the robotic system 100 can detect the objects at the start location 114 and/or the task location 116 and refine the detection results.

In some embodiments, for example, the sensors can include position sensors (e.g., position encoders, potentiometers, etc.) configured to detect positions of structural members (e.g., the robotic arms and/or the end-effectors) and/or corresponding joints of the robotic system 100. The robotic system 100 can use the position sensors to track locations and/or orientations of the structural members and/or the joints during execution of the task.

Example Device Configuration for Object Detection and Post-Detection Refinement

Figure 2:
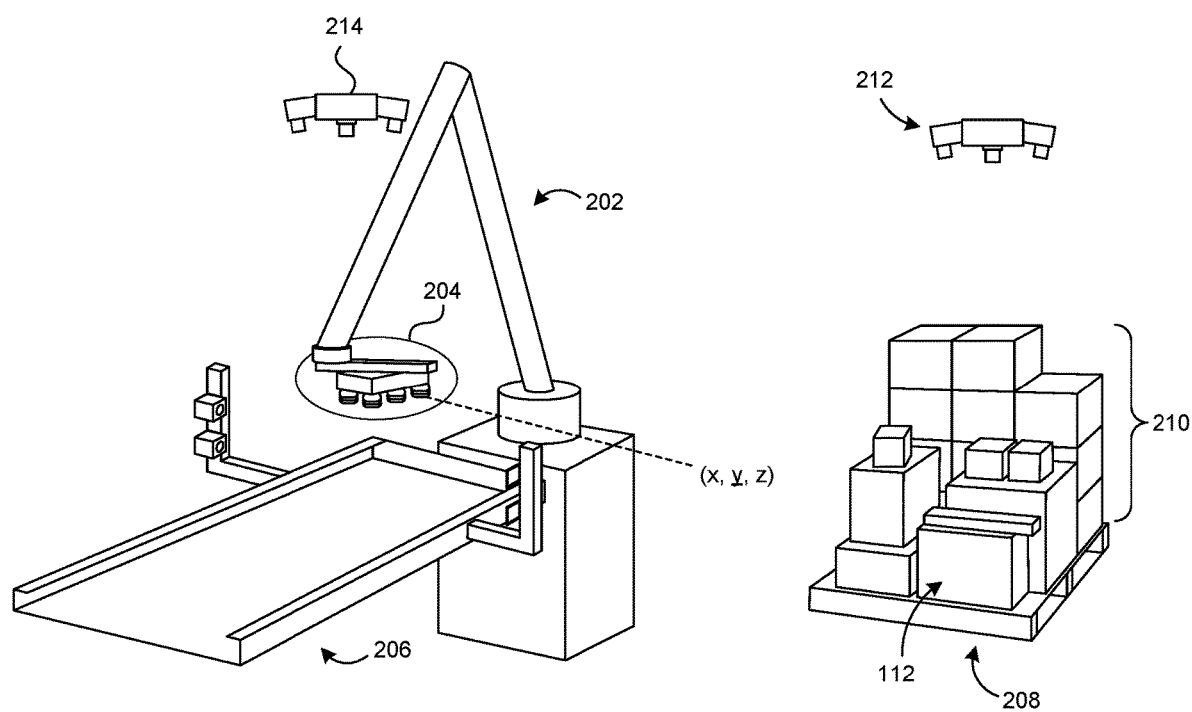
FIG. 2 is an illustration of the robotic system in accordance with one or more embodiments of the present technology.

FIG. 2 is an illustration of the robotic system 100 of FIG. 1 in accordance with one or more embodiments of the present technology. The robotic system 100 can include a robotic arm 202 (e.g., an instance of the transfer unit 104 of FIG. 1) that includes an end-effector 204 (e.g., a gripper). The robotic arm 202 can be configured to transfer the target object 112 between the start location 114 of FIG. 1 and the task location 116 of FIG. 1. As illustrated in FIG. 2, the start location 114 can have a pallet 208 with a target stack 210 (e.g., a grouping of objects) thereon. The task location 116 for the robotic arm 202 can be a placement location (e.g., a starting/egress point) on a conveyor 206 (e.g., an instance of the transport unit 106 of FIG. 1).

The robotic system 100 can use one or more sensors in performing the transfer operation with the robotic arm 202. In some embodiments, the robotic system 100 can include a first imaging sensor 212 and/or a second imaging sensor 214. The first imaging sensor 212 can include one or more 2D and/or 3D sensors, such as cameras and/or depth sensors, configured to image and/or analyze the start location 114. The second imaging sensor 214 can include one or more 2D and/or 3D sensors, such as cameras and/or depth sensors, configured to image and/or analyze the task location 116. For example, the first imaging sensor 212 can include one or more cameras and/or depth sensors located at a known location above and facing the start location 114. The first imaging sensor 212 can generate imaging data (e.g., 3D point clouds and/or visual or 2D images) corresponding to one or more top views of the start location 114, such as a top view of the target stack 210.

The robotic system 100 can use the imaging data from the first imaging sensor 212 to recognize or detect the objects in the target stack 210. In detecting the objects, the robotic system 100 can generate an initial detection hypothesis based on matching portions of the image data (e.g., the 2D image) or portions thereof to master data (e.g., predetermined surface images of expected/registered objects). The robotic system 100 can further process the image data (e.g., the 3D image) to refine the initial detection hypothesis. For example, the robotic system 100 can identify parallel edge pairs and corresponding crossing points to derive physical outlines or perimeters of the objects. The derived outlines can be processed to adjust or verify the initial detection hypothesis. Details regarding the detection and the refinement are discussed below.

Object Edge Detection

Figure 3:
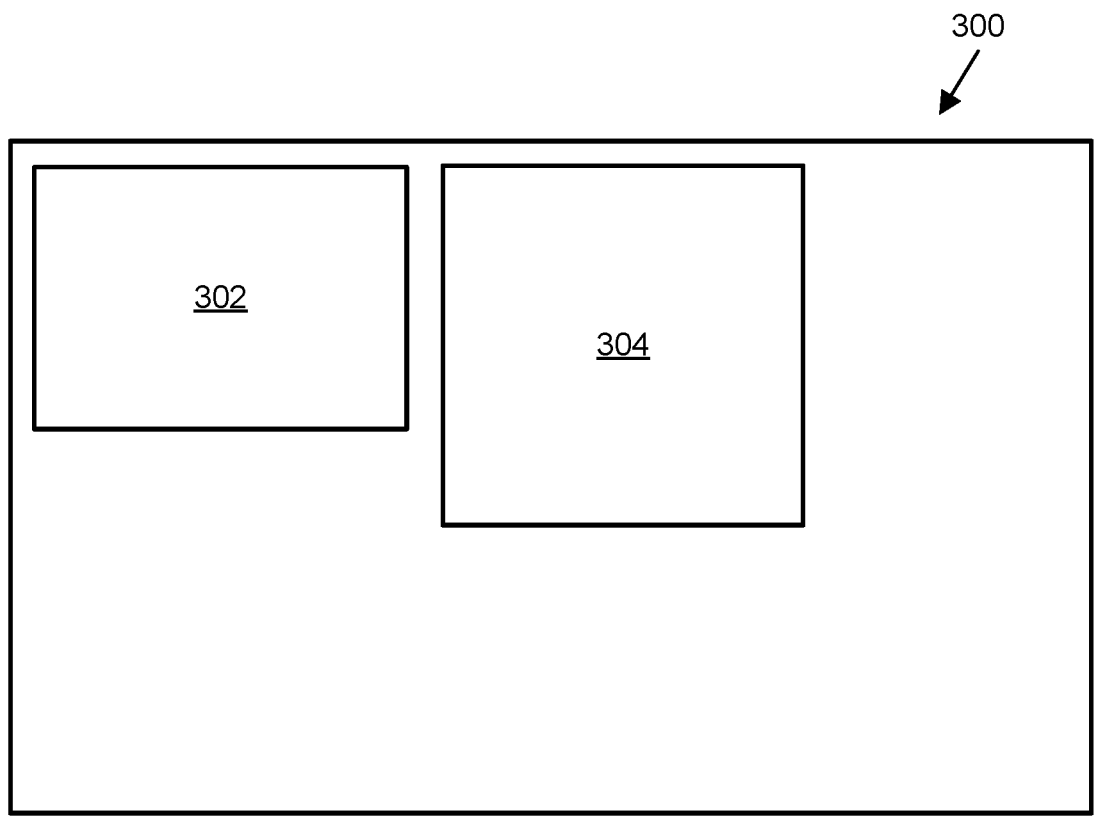
FIG. 3 is an illustration of a scene with multiple detectable objects in accordance with some embodiments of the present technology.

As noted above, an initial object estimation of an object or series of objects may be compared against additionally determined features of the object to verify and/or update a location/position of the object from the initial object estimation. FIG. 3 illustrates a scene 300 with multiple detectable objects 302, 304 in accordance with some embodiments of the present technology.

As shown in FIG. 3, the scene 300 can be an imaging data (e.g., a 2D visual image) from the first imaging sensor 212 of FIG. 2. The scene 300 can depict multiple detectable objects 302 and 304 (e.g., palletized boxes) at the start location 114. The robotic system 100 of FIG. 1 may analyze the imaging data to derive an initial object estimation for the objects 302 and/or 304. For example, the robotic system 100 can compare the scene 300 or portions thereof to surface images of registered objects in the master data. Using computer vision and/or other image analysis mechanisms, the robotic system 100 can determine that the regions in the scene 300 that correspond to the objects 302 and 304 match one or more surface images in the master data.

For each match, the robotic system 100 can derive the initial object estimation as an identifier for a corresponding registered object, a location of the detected object, a size of the detected object, a pose of the detected object, and/or other physical attributes associated with the detected object. For example, the robotic system 100 can determine that sufficient number of features (e.g., as defined by a confidence value and/or a threshold number/size of matching features) for first and second portions of the scene 300 that match registered images of the objects 302 and 304, respectively. Accordingly, the robotic system 100 can estimate that the objects 302 and 304 (e.g., candidate objects) are at the start location 112. Based on the match, the robotic system 100 can identify predetermined dimensions and/or edge locations relative to features in the registered images for the objects 302 and 304. The robotic system 100 can map the dimensions and/or the relative edge locations to the matching features in the scene 300 to derive or estimate the poses and/or the locations of the objects 302 and 304. The robotic system 100 can further locate the objects based on translating the locations in the image (e.g., pixel positions) to real-world locations based predetermined coordinate systems and/or mapping processes.

As discussed in greater detail below, a pairwise edge analysis may be utilized in verifying/updating the initial object estimation. In some instances, such as when the detected objects have similar visual features and/or dimensions, the pairwise edge analysis may further be used to distinguish the identity of the objects 302, 304 and/or verify dimensions of the objects represented in the initial object estimation.

Figure 4:
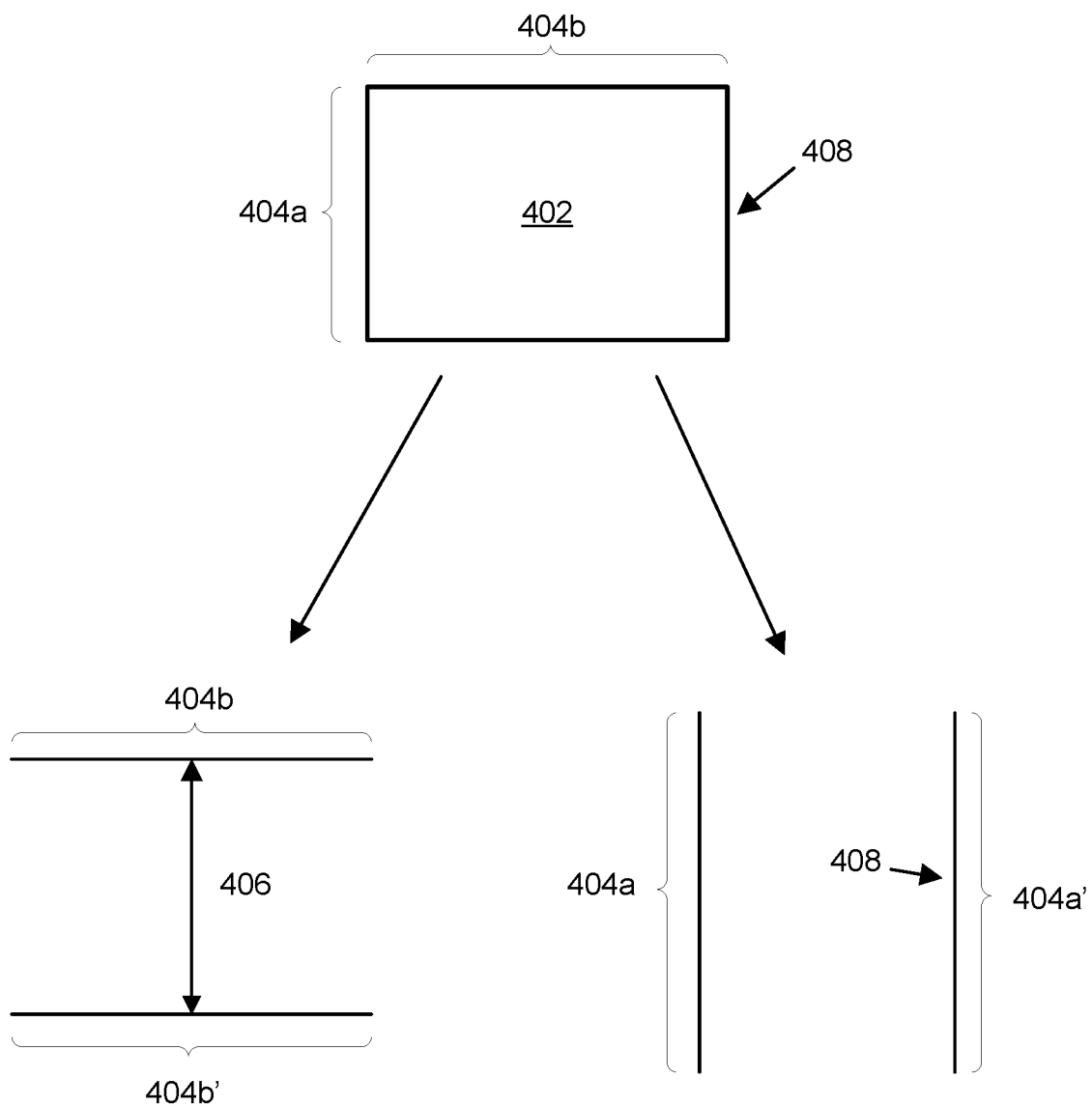
FIG. 4 is an illustration of a portion of a scene depicting an object in accordance with some embodiments of the present technology.

FIG. 4 is an illustration of a portion of an imaging output (e.g., 2D/3D imaging data) depicting an object 402 in accordance with some embodiments of the present technology. An imaging device (e.g., first imaging sensor 212, second imaging sensor 214) may capture image(s) of objects (e.g., palletized boxes). An image captured by the imaging device can illustrate an environment (or "scene") with one or more detectable objects. For example, the image can illustrate a top-view of multiple palletized boxes located at the start location 114 of FIG. 1. The scene captured in an image may provide a field of view that covers the area in which target objects (including, e.g., the object 402) are located.

Edges 404a and/or 404b of the object 402 may be detected by inspecting the captured image(s) of the object 402. For example, the robotic system 100 of FIG. 1 can use edge-detection mechanisms such as a Sobel filter and/or other edge-detection mechanisms to detect the depicted edges. As discussed in greater detail below, the image data (e.g. the 3D point cloud) and/or the detected edges may be used to determine a 3D corner of an object that can be used to determine an offset between the determined features of the object and the initial object estimation.

For each of the detected edges, the robotic system 100 can derive an edge orientation 408. The edge orientation 408 may include a direction/orientation of a detectable edge of an object. For example, the edge orientation 408 can include an alignment or a slope of an edge relative to a reference coordinate system (e.g., 2D or 3D cartesian coordinates in a Euclidian Space) for the scene represented by the image. In some embodiments, the edge orientation 408 can be represented by an edge vector that includes both a direction and magnitude of a detected edge.

The object 402 (e.g., a box) may include multiple parallel edges. For example, the captured image may depict an edge 404a' parallel to the edge 404a. Similarly, the captured image may depict an edge 404b' parallel to the edge 404b.

The robotic system 100 may determine that a set of edges are parallel based calculating and comparing the orientations 408. As an illustrative example, the robotic system 100 can identify the parallel edges based on deriving clusters of the detected edges. The robotic system 100 may derive the edge cluster based on comparing the detected edges according to a dot product of V1 and V2, where V1 and V2 are vector representations of a unique edge. The angles or orientations of the edges can correspond to the direction component of the vectors. The robotic system 100 can determine that the two vectors are parallel when the angle of the dot product is less than an angle threshold.

In some embodiments, the robotic system 100 can derive the edge cluster based on comparing the detected edges within a threshold area/distance from a targeted edge. For example, the threshold area/distance can correspond to dimensions of a largest registered object. Also, the robotic system 100 may derive the edge clusters based on the detected edges at or within threshold distances from edges of the initial object estimations. For example, the robotic system 100 can identify analysis areas that extend beyond the boundaries of the initial object estimations. In other words, the robotic system 100 can identify the analysis areas that each surround or include an instance of the initial object estimation and regions immediately adjacent thereto. The robotic system 100 can determine the edge clusters within each of the initial object estimations. Similarly, the robotic system 100 may also derive the edge cluster based on comparing the detected edges located in areas that correspond to or are defined by (e.g., according to a predetermined template) a physical feature (e.g., a 3D corner or a 3D edge), a minimum/maximum object size, an area that has match 3D point cloud values (e.g. a continuous surface), an area within an analysis platform (e.g., a pallet), or a combination thereof.

The robotic system 100 can use the edge clusters to identify regions in the image data. For example, the robotic system 100 can identify intersections (e.g., corners) of detected edges having different orientations. The robotic system 100 can detect that an object exits when a set (e.g., a first pair) of clustered or parallel edges intersect another set (a second set) of clustered or parallel edges to form a predetermined number of corners (e.g., four corners). The robotic system 100 can determine that the corresponding edge sets and the bounded area therein represents the detected object. Accordingly, the robotic system 100 can detect an object based on the edges and separately from the initial object estimations. Details regarding the edge-based object detection are described below.

The robotic system 100 can derive a detectable edge distance 406 between parallel edges (e.g., edges 404b, 404b'). The detectable edge distance 406 may include a distance between parallel edges (e.g., edges 404a, 404a' or edges 404b, 404b') that are coplanar and/or located within a threshold area/distance from each other. The detectable edge distance 706 may represent a length or width of object 402. As described in greater detail below, the detectable edge distance 406 may be utilized in determining whether the dimensions of an object correspond to dimensions included in an initial object estimate for an object.

Object Edge Cross Point Detection

Figure 5:
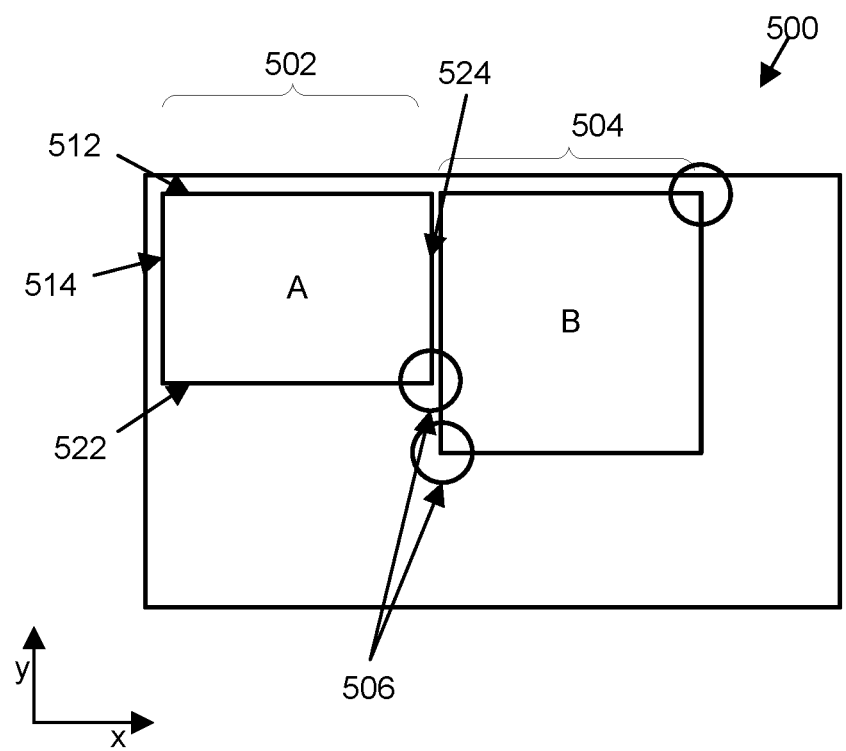
FIG. 5 is an illustration of edge-based object detection in accordance with some embodiments of the present technology.

The detected parallel edge sets of an object may be used in identifying a series of cross points (or "3D corners") of the detected edges. The identified cross points can be used to detect an object according to the detected edges. FIG. 5 is an illustration of edge-based object detection in accordance with some embodiments of the present technology. As shown in FIG. 5, a scene 500 (e.g., 2D imaging output from the first imaging sensor 212 of FIG. 2) can illustrate a first detected edge set 502 corresponding to a first object (A) and a second set of detected edge set 504 corresponding to a second object (B).

As described above, the robotic system 100 can derive the edge clusters based on the detected edge sets 502 and 504. As an illustrative example, the robotic system 100 can derive a first cluster based on a first edge 512 having a first orientation. As described above, the robotic system 100 can analyze the detected edges within an area that corresponds to the first edge 512. Based on the analysis, the robotic system 100 can derive an edge cluster (e.g., a set or a pair of parallel edges) that includes the first edge 512 and a first corresponding edge 522 determined to be parallel to the first edge 512. Similarly, the robotic system 100 can derive a second cluster based on a second edge 514 having a second orientation and/or intersects with the first edge 512. The second cluster may include the second edge 514 and a second corresponding edge 524 determined to be parallel to the second edge 514.

The robotic system 100 can further process the edge clusters to identify detected corners 506 where a set of edges having different orientations intersect. The robotic system 100 may trace the detected edges from one end toward the other end to determine whether the edges intersect with another edge. When sets or pairs of edges from different clusters intersect each other, the robotic system 100 can determine that the edges form boundaries that enclose an area. As illustrated in FIG. 5, the robotic system 100 can determine that the first pair of parallel edges 512 and 522 intersect the second pair of parallel edges 514 and 524. Accordingly, the robotic system 100 can determine that the edges 512, 514, 522, and 524 correspond to or define a detected object (e.g., object A). Similarly, the robotic system 100 can analyze other detected edges in the scene to determine other intersections and subsequently other objects depicted in the scene.

Edge Rating

An edge rating may be derived that provides a metric for quantifying an accuracy/precision of detected edges, detected parallel edge pairs, and/or an edge cross point. The edge rating can be used in determining an accuracy of a detected edge and for post-detection refinement and validation (e.g., updating/validating an initial object estimation). The edge rating can include a dynamic/cumulative value that represents an accuracy of any detected features of an object. In some cases, the edge rating can indicate an accuracy of the detected object relative to the candidate object included in the initial object estimation.

An edge rating can be derived based on various factors. For example, an edge rating can be based on a measure of continuity (e.g., indicative of whether the edge includes discontinuities or irregular changes in measured/depicted values). As another example, the edge rating can be based on a level of linearity of a detected edge. The robotic system 100 may compare the edge shape to a predetermined template or pattern to determine the level of linearity.

The edge rating can also be computed or adjusted based on a measure of similarity between detected parallel edge pairs and/or the candidate object corresponding to the initial object estimation. For instance, the measure of similarity may be computed according to lengths, thicknesses, color, and/or orientations of the detected edges within each cluster and/or the intersecting clusters. The edge rating can also be based on a degree of overlap between the detectable edges identified in the 2D image and the edge points in the 3D point cloud. For example, the robotic system 100 can map the points in the 2D image to points in the 3D image and/or the real-world according to a predetermined grid/coordinate system and/or a mapping function (e.g., one or more equations and/or look-up tables). With the common locational mapping, the robotic system 100 can compare the detected edges in the 2D images to detected edges in the 3D images. The robotic system 100 can calculate the edge rating based on the proximity between corresponding edges in the 2D and the 3D images. Accordingly, edges that are detected at the same location in both the 2D and the 3D images can have higher edge ratings. The edge ratings can decrease when corresponding edges in the 2D and 3D images are further apart.

In some embodiments, the edge rating can be based on detected edge cross points (e.g., corners). For example, the locations of the identified corners (e.g., 2D corners) can be compared to the locations of the 3D corners. The edge ratings of the detected edges that form the corner can be computed based on the degree of overlap or co-location as described above for the edge comparisons. Also, the edge ratings for the detected edges that form the corner can be computed based on the corner angle. In some embodiments, the edge ratings can increase when the corner angle is closest to 90°.

The edge rating can be determined after identification/extraction of detectable edges or identifying edge clusters, as described herein. In some embodiments, the edge rating can be determined after any of identification of the parallel edge pairs, determining a parallel edge set, projecting the detected parallel edge pairs to a 3D edge projection, and/or identifying edge cross points.

In some embodiments, the robotic system can reject the detected edges based on an edge score (e.g., when the edge score is below an edge detection threshold). As another example, during or prior to the refinement/verification process, the robotic system 100 can decide whether to use the detected edge cross points to refine and/or verify the initial object estimation.

Refining/Verification of the Initial Object Estimation

Figure 6:
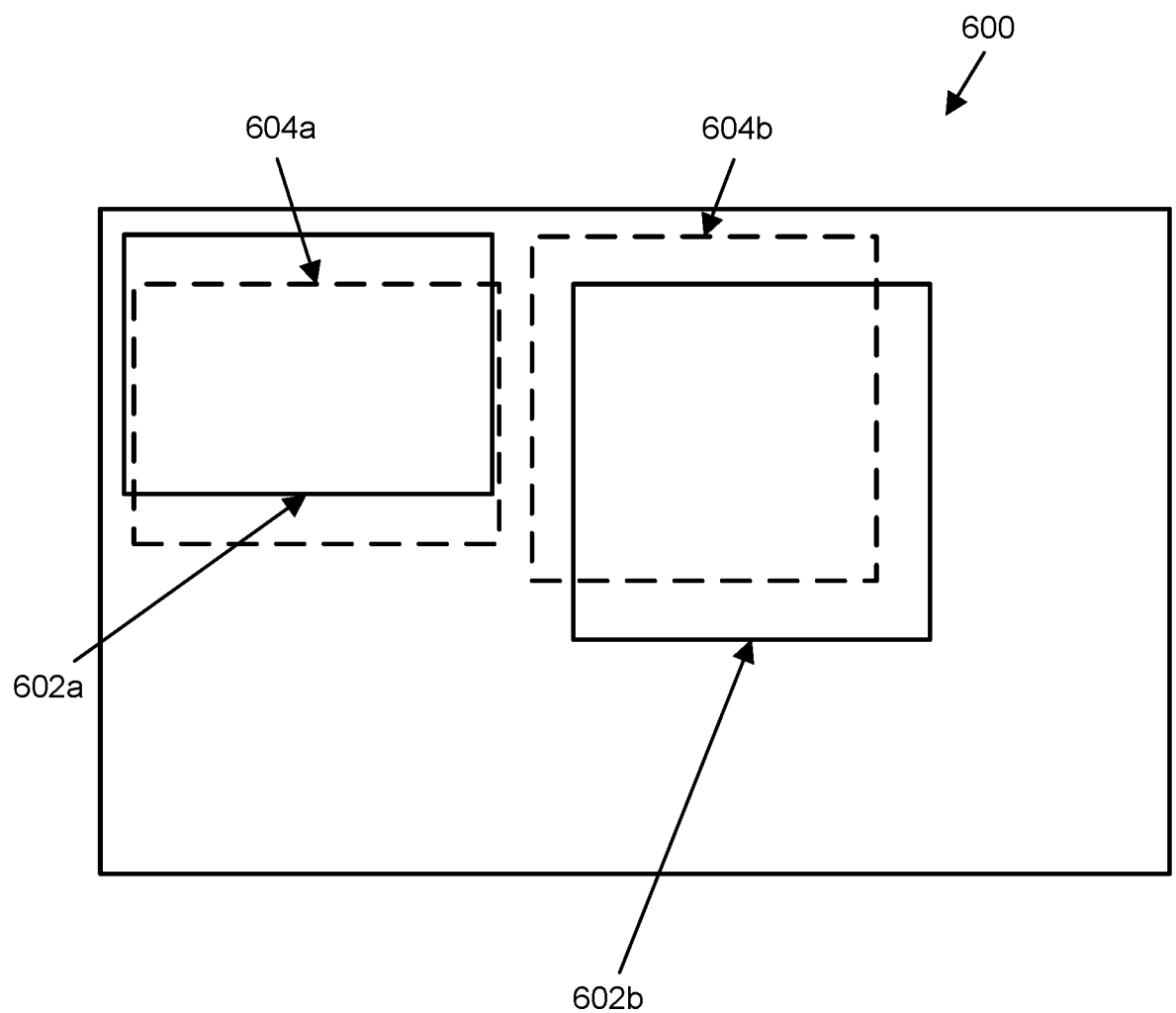
FIG. 6 is an illustration of a scene with detected edges and initial object estimations in accordance with some embodiments of the present technology.

FIG. 6 is an illustration of a scene 600 with detected edges 602a and 602b, as depicted by the dashed lines, and initial object estimations 604a and 604b, as depicted by the solid lines, in accordance with some embodiments of the present technology. The detected edges 602a can correspond to a first object (e.g., the object 302 of FIG. 3), and the detected edges 602b can correspond to a second object (e.g., the object 304 of FIG. 3). Similarly, the initial object estimation 604a can correspond to the first object, and the initial object estimation 604b can correspond to the second object.

As shown in FIG. 6, the detected edges may not align with boundaries/edges of the initial object estimations. The differences may be caused by the robotic system 100, such as during image processing and derivation of the initial object estimations. The differences may also be caused by inconsistencies of the object. For example, the actual object may have visual features (e.g., logos, designs, and/or other visible markings) that are different from or located at unexpected locations relative to the registered image due to manufacturing, printing, and/or packaging errors.

As described in detail below, the robotic system 100 can use the detected edges to update and/or verify the initial object estimations. Accordingly, the robotic system 100 can reduce or remove failures caused by inaccurate object detection. In other words, the robotic system 100 can use the detected edges to fortify the visible feature-based object detection.

Figure 7:
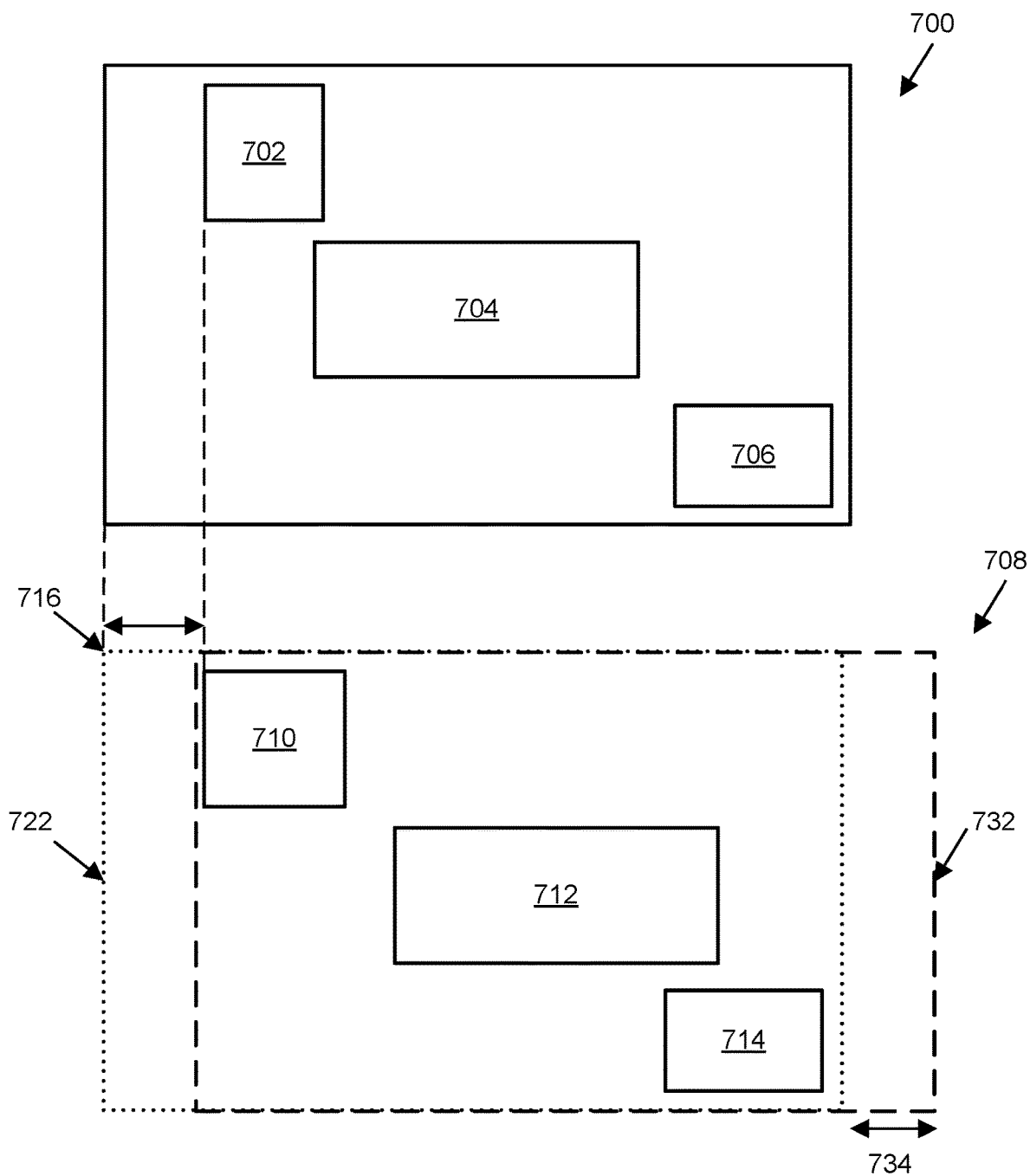
FIG. 7 is an illustration of an updated object estimation in accordance with some embodiments of the present technology.

As noted above, an initial object estimation may be updated and/or verified based on the detected features of an object. FIG. 7 is an illustration of an updated object estimation in accordance with some embodiments of the present technology. As described above, the robotic system 100 of FIG. 1 may compare a scene 708 or a portion thereof to an object template 700 (e.g., a predetermined surface image or features set for a registered object) to derive an initial object estimation 722.

The robotic system 100 can detect a potential match when a portion of the scene 708 matches the object template 700. As shown in FIG. 7, the object template 700 may include features 702, 704, 706. Example features 702, 704, 706 can include visible features, such as surface designs, letters, numbers, symbols, edges, etc. For the matching scenario, the portion of the scene 708 may include features 710, 712, 714 that respectively match features 702, 704, 706. Accordingly, the robotic system 100 can derive the initial object estimation 722 based on identifying an outline around the features 710, 712, and 714. The outline can be identified according to one or more reference locations 716 (e.g., locations separated by corresponding predetermined distances/directions) relative to one or more of the matching features. As illustrated in FIG. 7, one of the reference locations 716 can be a corner of an outline that is separated by a predetermined distance from the depicted feature (e.g., the feature 710) that matches the feature 702. The robotic system 100 can identify the outline as the estimated edges of the corresponding object.

In some embodiments, refining or updating the initial object estimation 722 may include comparing the detected edges and/or the cross points of the detected edges (e.g., corners) to detected 2D/3D corners. For example, the robotic system 100 can identify an object edge set 732 from the 2D and/or the 3D images. The object edge set 732 can be a result from the edge-based object detection described above and include intersecting sets of parallel edges determined to at least partially enclosing an area. In some embodiments, the robotic system 100 can identify a set of the detected edges 732 enclosing an area that at least partially overlaps with the initial object estimation 722. The robotic system 100 can compare the corresponding locations of the edges/corners between the initial object estimation 722 and the 2D/3D images. When the compared edges/corners do not align, the robotic system 100 can calculate one or more shift distances 734 between the edges/corners of the initial object estimation 722 and the detected edges 732. The robotic system 100 may calculate the shift distances 734 along one or more predetermined directions (e.g., along an x-axis and a y-axis) and/or as a vector between matching locations.

When the shift distances 734 are greater than a predetermined shift threshold, the robotic system 100 may update the initial object estimation 722. For example, the robotic system 100 can shift the initial object estimation 722 by the shift distances 734 such that the object estimation coincides with the detected edges 732 that include the matching features (e.g., the features 710, 712, and 714). In some embodiments, the robotic system 100 can shift the initial object estimation 722 by combining (e.g., averaging) the separations between the initial object estimation 722, the 2D object recognition results, and/or the 3D object recognition results. When the object recognition results from the 2D and 3D images do not align, the robotic system 100 may prioritize (by, e.g., selecting one and discarding the others or by placing greater processing weights on) the 3D imaging results over the 2D imaging results. Similarly, the robotic system 100 may prioritize the 2D edge-detection results over the initial object estimation 722 resulting from feature matching.

In some embodiments, the robotic system 100 can use the 2D features to generate the initial object estimation 722 and the 2D edge-processing to initially verify or adjust the object estimation 722. The robotic system 100 can further use the 3D edges/corners or locations thereof to further adjust or validate the object estimation. Validating the object estimation may include determining if discrepancies exist between the edges/corners of the object estimation and corresponding edges/corners in the 3D depth map. In other words, the robotic system 100 can determine whether or not the 3D depth map includes edges/corners (e.g., drop offs or changes in depth measures forming or along one or more lines) at locations corresponding with the object estimation. When the robotic system 100 detects discrepancies in the compared data, the robotic system 100 can reject the object estimation and/or further adjust the object estimation as described above.

Figure 8:
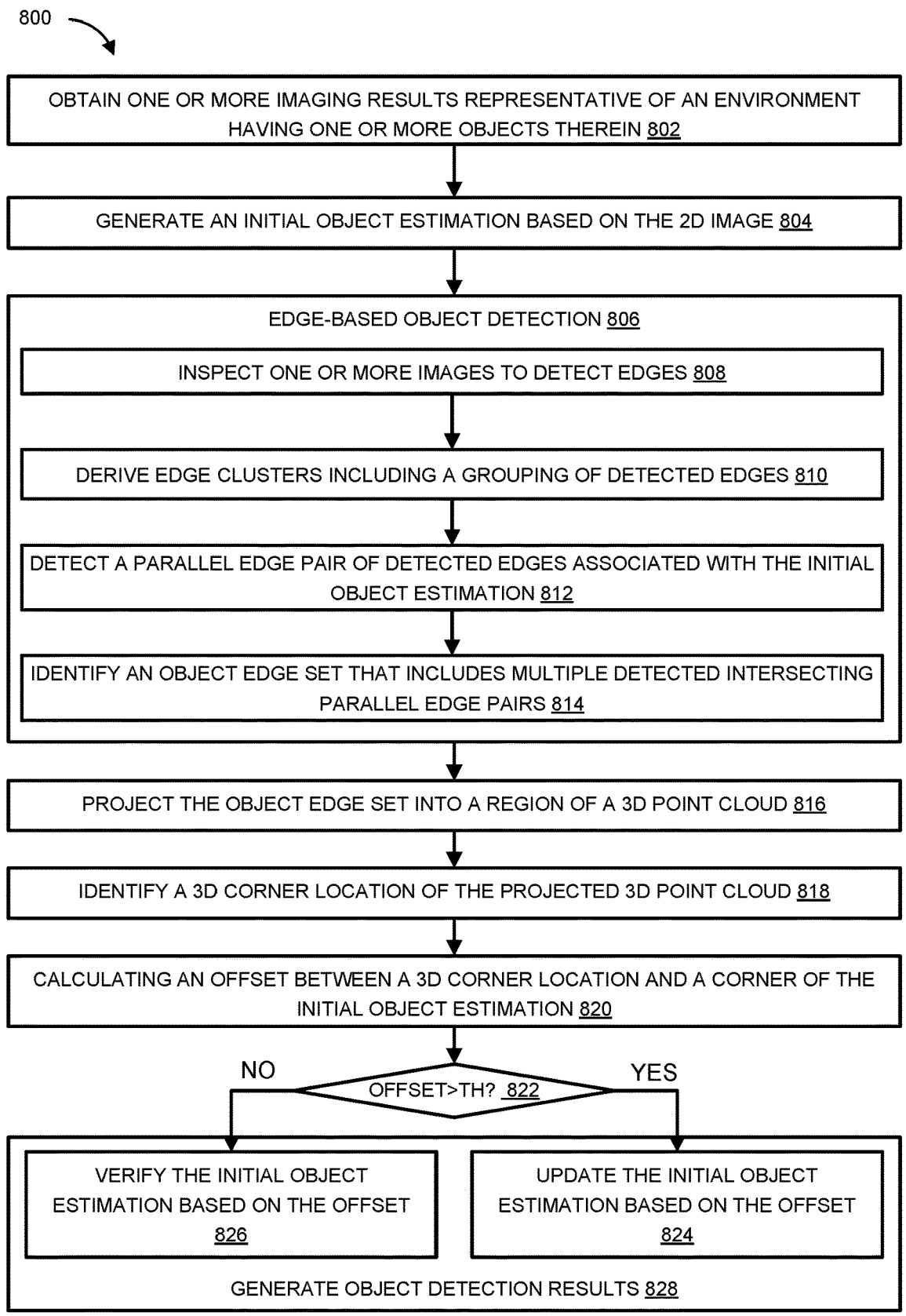
FIG. 8 is a block diagram of a method of operating the robotic system of FIG. 1 in accordance with some embodiments of the present technology.

FIG. 8 is a block diagram of a method 800 of operating the robotic system 100 of FIG. 1 in accordance with some embodiments of the present technology. The method 800 may include obtaining one or more imaging results (e.g., 2D and/or 3D image data) representative of an environment having one or more objects therein (block 802). The images can be captured by one or more imaging devices, such as the first image sensor 212 or second image sensor 214, both as shown in FIG. 2. For example, the 2D and/or the 3D images can be top-view depictions of palletized boxes.

The method 800 may include generating an initial object estimation based on the 2D image (block 804). The initial object estimation may include an estimated identification and/or an estimated location of an object located in the environment. As described above, the robotic system 100 can generate the initial object estimation based on analyzing/comparing visual features depicted in the 2D images to the master data. For example, the robotic system 100 can compare the 2D image or a portion thereof to the surface images in the master data that represent surfaces of registered objects. The robotic system 100 can generate the initial object estimation when one or more features in the 2D image matches a surface image of one of the registered objects. The robotic system 100 can determine an identifier (e.g., an object name and/or an identification code) of the matching registered object as the estimated identification. The robotic system 100 can use the matching features to map or project the matching image onto the 2D image. The robotic system 100 can further map the corresponding locations in the 2D image to real-world location(s), thereby determining the estimated object location. For example, the robotic system 100 can estimate locations of peripheral edges and/or corners of the estimated object.

The method 800 may include performing an edge-based object detection (block 806). The edge-based object detection can include identifying multiple intersecting sets/pairs of edges detected in the 2D image. As such, the robotic system 100 may begin the edge-based detection by inspecting the 2D image to detect edges depicted therein (block 808). As noted above, a series of edges of the target object can be detected using a suitable edge detection technique (e.g., canny edge detection and the Sobel filter).

The edge-based object detection may include deriving edge clusters that each include a grouping of detected edges (block 810). For instance, an edge cluster can include at least two detected edges within a predefined region as described above. The robotic system 100 can determine an edge orientation indicative of a direction of the detected edges. The robotic system 100 may group the detected edges according to determined edge orientations of the detected edges.

The edge-based object detection may include detecting parallel edge sets/pairs based on the edge cluster (block 812). In some embodiments, the parallel edge sets may each include two detected edges that have orientations determined to be parallel to one another. As described above, the robotic system 100 can detect the parallel edge sets based on analyzing edges within an analysis area. In some embodiments, the robotic system 100 can detect the parallel edge sets based on determining that the subset of detectable edges included in the edge cluster intersect at an angle within a threshold angle. The robotic system 100 may detect the parallel edge sets based on a qualifying condition, such as by comparing the detectable edge distance 406 of FIG. 4 to predetermined dimensions of the registered object associated with the initial object estimation. The robotic system 100 can detect the parallel edge sets based on selecting edges in the edge cluster with the detectable edge distance 406 that matches (e.g., is within a separation threshold) the registered dimensions.

The method 800 may include identifying an object edge set that includes multiple detected intersecting parallel edge pairs (block 814). The object edge set may include multiple parallel edge pairs that have different orientations and/or intersect with one another. For example, the robotic system 100 can identify the object edge set as a first parallel edge pair having a first orientation and a second parallel edge pair having a second orientation that intersects with the first parallel edge pair. Accordingly, the robotic system 100 can identify the object edge set as the four edges that connect to each other and enclose an area.

The method 800 may include projecting the object edge set onto a region of the 3D image (e.g., point cloud) that represents the environment having the one or more objects therein (block 816). In some embodiments, the robotic system 100 can map points in the 2D image and the 3D image to each other and/or corresponding real-world locations. The robotic system 100 can project the points using predetermined processes, coordinate systems, look-up tables, and/or equations that correspond to fixed/known locations and orientations of the imaging devices. Accordingly, the robotic system 100 can determine portions/locations in the 3D image that corresponds to the edges in the object edge set.

The method 800 may include identifying a 3D corner location within the 3D image data (block 818). The 3D corner may be used, such as by the robotic system 100, to analyze an area that has a predetermined shape/size and includes a location of a corner associated with the object edge set. The 3D corner can be used to search for an intersection between 3D edges (e.g., sets of adjacent locations where the depth measure changes) within the analysis area.

The method 800 may include calculating an offset between the 3D corner location and the corresponding corner location of the initial object estimation (block 820). The offset may represent a difference in position, such as by a distance and/or orientation, between a 3D corner location of a projected 3D point cloud and a corner location of the initial object estimation. In some embodiments, the robotic system 100 can compare 2D and 3D edges to calculate the offsets as described above.

The method 800 may evaluate the offset (decision block 822). In other words, the robotic system 100 can determine whether the initial object estimation (e.g., a location of the estimated object) is accurate according to the 3D sensor data. The robotic system 100 can evaluate based on comparing the calculated offset (e.g., a distance between the corner/edge of the initial object estimation and the 2D/3D corner/edge location) and/or the edge rating to one or more predetermined thresholds. In some embodiments, a detected edge cross point may be rejected based on determining that the offset distance is greater than a threshold separation distance. In some embodiments, a detectable edge is rejected based on determining that the edge rating is below a threshold level.

The method 800 may include generating an object detection result based on the offset and the initial object estimation (block 828). Generating the object detection result may include updating the initial object estimation based on the offset (block 824). For example, when the calculated offset is greater than the threshold separation distance, the initial object estimation may be updated to account for the offset. In other words, the robotic system 100 can shift the initial object estimation along the direction of the shift by a distance that corresponds to the magnitude of the calculated offset. In some embodiments, the robotic system 100 can adjust the initial object estimation to align with the 2D/3D corner or edge, thereby shifting the initial object estimation according to the calculated offset. In other embodiments, the robotic system 100 can shift the initial object estimation by a fraction of the magnitude of the calculated offset.

Generating the object detection result may include verifying the initial object estimation based on the calculated offset (block 826). When the offset is not greater than the threshold and the initial object estimation essentially aligns with the 2D/3D corner or edge, the robotic system 100 can verify the initial object estimation. In some embodiments, the robotic system 100 can verify/update the initial object estimation according to 2D corner/edge and then according to 3D corner/edge. For example, the robotic system 100 can first verify the initial object estimation based on comparing one or more edges/corners thereof to locations of edges/corners separately detected from the 2D image. The robotic system 100 can verify or adjust accordingly. Then, the robotic system 100 can similarly compare the edges/corners of the verified/adjusted result to the locations of edges/corners in the 3D image.

The robotic system 100 can use the generated objection detection results to manipulate the detected object. For example, the robotic system 100 can use the object detection results to locate the detected object. According to the location, the robotic system 100 may derive and implement a motion plan (e.g., a set of commands and/or settings for operating a robotic unit) to grip, lift, horizontally transfer, lower, and/or release the object.

In some embodiments, the method 800 may include generating the edge rating indicating an accuracy of the object edge set. The edge rating may be utilized in verifying or updating the initial object estimation. As an example, generating the edge rating may be based on any of: a continuity of the detected edges included in the object edge set; an orientation of the detected edges included in the object edge set; a similarity between each of the detected edges included in the object edge set and a corresponding edge in the predetermined object dimension estimation information; and an overlap between detectable edges in the image and the three-dimensional point cloud. In another example, generating the edge rating may be based on an alignment between detected parallel edge pairs in the parallel edge set and alignment of the detected edge cross with respect to a detected three-dimensional corner in the initial object estimation. In some embodiments, the robotic system 100 can generate the edge ratings as part of inspecting the one or more images to detect the edges. The robotic system 100 may verify the detected edges according to the edge ratings, such as by comparing the edge ratings of each of the candidate edges to an edge verification threshold. The robotic system 100 can use the verified candidate edges as the detected edges and discard the detected edges that do not satisfy the edge verification threshold. Accordingly, the robotic system 100 can further increase the accuracy of the resulting object detection.

The validation and/or update of the initial feature-based object estimation using detected 2D/3D edges or corners can provide reduced object-processing failures. The validation and update can account for computer-vision or image processing errors, sensor errors, and/or defects on the surfaces of the objects, thereby improving the accuracy of the object detection/location. The improved accuracy of the object detection/location can allow the robotic system 100 to accurately manipulate the object for the tasks. For example, the robotic system 100 can improve the likelihood of gripping the object at or about the CoM, which can reduce collisions and/or grip failures caused by weight imbalance during object transfer.

Further, analyzing the edges within an analysis area about the initial object estimation provides increased processing efficiency. The robotic system 100 can limit the amount of analyzed features by deriving and analyzing within the analysis area. In other words, the robotic system 100 can analyze portions of the 2D/3D images to detect edges, derive clusters, identify the object edge set, etc. instead of processing the images in their entirety. Accordingly, the robotic system 100 can reduce the processing time and/or resources to verify and/or update the object estimations.

Moreover, detecting the edges, deriving the edge clusters, detecting parallel edge sets, and identifying the object edge set (e.g., edge-based object detection) provides accurate and an efficient way to detect objects. For example, the robotic system 100 can remove or reduce false positives (e.g., detecting empty spaces bounded by parallel edges of separated objects as objects) that may result from detecting based only on edge pairings. Further, with the 3D verification component, the robotic system 100 can further remove or reduce false positives. Also, deriving clusters, detecting pairs therein, and then identifying the set of edges that are connected to each other can allow the robotic system 100 to efficiently perform the edge-based object detection without testing multiple different scenarios for each edge.

Example Processing System

Figure 9:
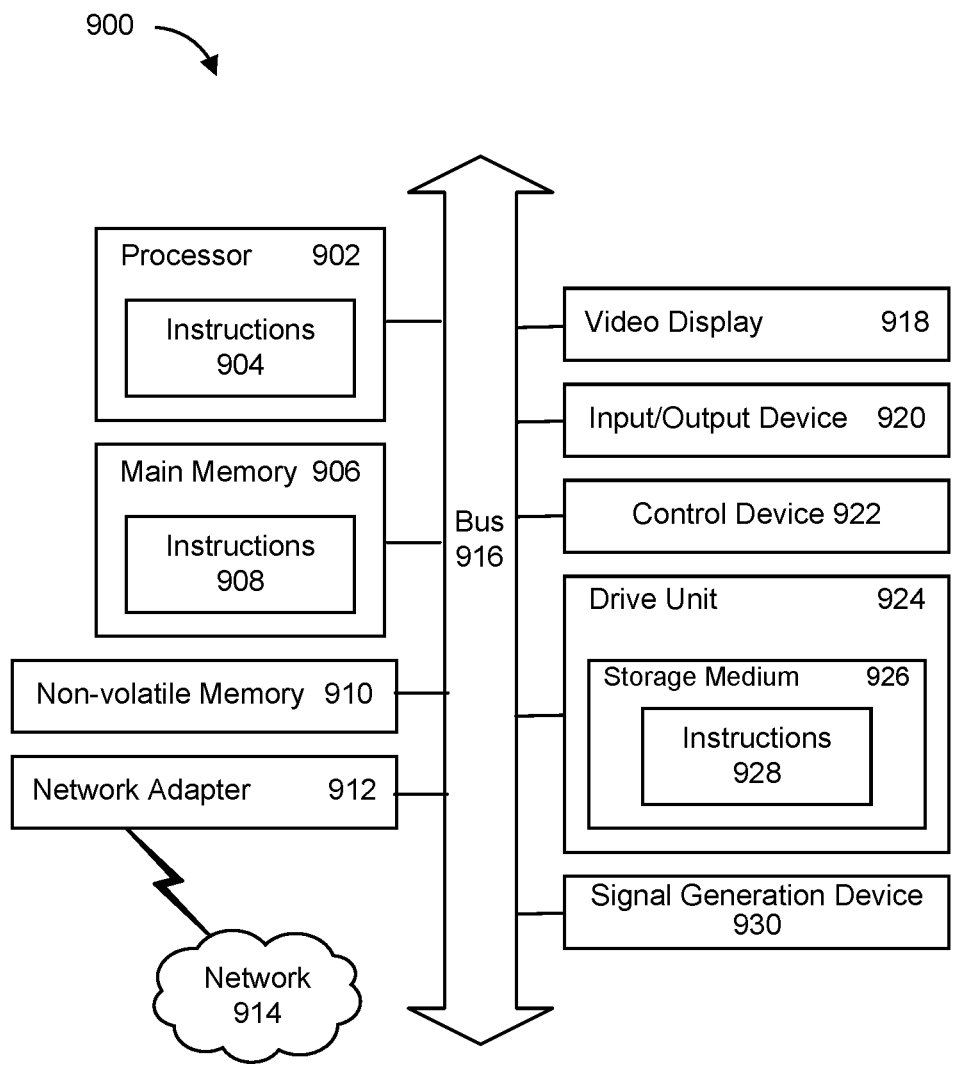
FIG. 9 is a block diagram that illustrates an example of a processing system in which at least some operations described herein can be implemented.

FIG. 9 is a block diagram illustrating an example of a processing system 900 in which at least some operations described herein can be implemented. As shown in FIG. 9, the processing system 900 may include one or more central processing units ("processors") 902, main memory 906, non-volatile memory 910, network adapter 912 (e.g., network interfaces), video display 918, input/output devices 920, control device 922 (e.g., keyboard and pointing devices), drive unit 924 including a storage medium 926, and signal generation device 930 that are communicatively connected to a bus 916. The bus 916 is illustrated as an abstraction that represents any one or more separate physical buses, point to point connections, or both connected by appropriate bridges, adapters, or controllers. The bus 916, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 900 operates as part of a user device, although the processing system 900 may also be connected (e.g., wired or wirelessly) to the user device. In a networked deployment, the processing system 900 may operate in the capacity of a server or a client machine in a client-server network environment, or as a peer machine in a peer-to-peer (or distributed) network environment.

The processing system 900 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 900.

While the main memory 906, non-volatile memory 910, and storage medium 926 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 928. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 904, 908, 928) set at various times in various memory and storage devices in a computer, and that, when read and executed by one or more processing units or processors 902, cause the processing system 900 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 910, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 912 enables the processing system 900 to mediate data in a network 914 with an entity that is external to the processing system 900 through any known and/or convenient communications protocol supported by the processing system 900 and the external entity. The network adapter 912 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 912 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A tangible, non-transient computer-readable medium having instructions stored thereon that, when executed by a processor, cause the processor to perform a method, the method comprising:

obtaining a first image and a second image representative of an environment having an object located therein, wherein the first and second images use different imaging characteristics to depict the object;

based on the first image, computing an estimated location of the object;

identifying one or more object edges based on analyzing the first image, wherein the identified object edges correspond to the object;

identifying a feature location based on comparing the one or more object edges and the second image, the feature location representing a location of a feature in the second image that corresponds to the one or more object edges; and generating an object detection result based on the estimated location and the feature location.

2. The tangible, non-transient computer-readable medium of claim 1, wherein the instructions further cause the processor to:

detect edge depictions from the first image;

determine an edge orientation for each object edge depiction; and group the edge depictions according to edge orientations, wherein each grouping includes parallel instances of the edge depictions having angular orientations within a threshold range from one another;

wherein the one or more object edges are identified from the groupings of the edge depictions.

3. The tangible, non-transient computer-readable medium of claim 1, wherein the first and second images represent a two-dimensional representation, a three-dimensional representation, or a combination thereof.

4. The tangible, non-transient computer-readable medium of claim 1, wherein the instructions further cause the processor to:

compare at least a portion of the first image to master data that include surface textures of registered objects; and when the compared portion of the first image corresponds to a surface texture of a registered object in the master data, identify that the object is the registered object;

wherein the estimated object location is computed based on a location corresponding to the compared portion.

5. The tangible, non-transient computer-readable medium of claim 1, wherein the instructions further cause the processor to:

calculate an offset between the feature location and the one or more object edges corresponding to the feature location;

wherein generating the object detection result includes validating and/or adjusting the estimated location according to the offset.

6. The tangible, non-transient computer-readable medium of claim 1, wherein:

identifying the one or more object edges includes identifying at least a set of edges that represent boundaries of a depicted surface of the object, wherein the set of edges form at least one corner; and the feature location corresponds to the feature corresponding to an edge in the set of edges or the corner.

7. The tangible, non-transient computer-readable medium of claim 1, wherein the instructions further cause the processor to:

generate an initial object estimation based on comparing the first image to surface textures of registered objects as stored in master data, wherein the initial object estimation includes an estimated identification and the estimated location of the object;

calculate one or more detectable edge distances between corresponding pairs of the detected edges;

compare resulting detectable edge distances to dimensions of a registered object in the master data matching the estimated identification; and select a pair of edges for a parallel edge set, wherein the pair of edges corresponds to the detectable edge distance that matches one of the dimensions of the registered object.

8. The tangible, non-transient computer-readable medium of claim 1, wherein the instructions further cause the processor to:

generate an edge rating for each detected edge;

wherein identifying the feature location includes comparing to the second image the object edges having the edge rating that exceed an edge detection threshold.

9. The tangible, non-transient computer-readable medium of claim 1, wherein generating the object detection result includes updating an initial object estimation when an offset between the feature location and the one or more object edges exceeds a threshold separation distance, wherein the initial object estimation is generated based on comparing the first image to master data.

10. The method of claim 1, wherein generating the object detection result includes verifying an initial object estimation when an offset between the feature location and the one or more object edges is less than a threshold separation distance, wherein the initial object estimation is generated based on comparing the first image to master data.

11. A method of operating a robotic system, the method comprising:

obtaining a first image and a second image representative of an environment having an object located therein, wherein the first and second images use different imaging characteristics to depict the object;

based on the first image, computing an estimated location of the object;

identifying one or more object edges based on analyzing the first image, wherein the identified object edges correspond to the object;

identifying a feature location based on comparing the one or more object edges and the second image, the feature location representing a location of a feature in the second image that corresponds to the one or more object edges; and generating an object detection result based on the estimated location and the feature location.

12. The method of claim 11, further comprising:
detecting edge depictions from the first image;
determining an edge orientation for each object edge depiction; and
grouping the edge depictions according to edge orientations, wherein each grouping includes parallel instances of the edge depictions having angular orientations within a threshold range from one another;
wherein the one or more object edges are identified from the groupings of the edge depictions.

13. The method of claim 11, further comprising:
comparing at least a portion of the first image to master data that include surface textures of registered objects; and
when the compared portion of the first image corresponds to a surface texture of a registered object in the master data, identify that the object is the registered object;
wherein the estimated object location is computed based on a location corresponding to the compared portion.

14. The method of claim 11, further comprising:
calculate an offset between the feature location and the one or more object edges corresponding to the feature location;
wherein generating the object detection result includes validating and/or adjusting the estimated location according to the offset.

15. The method of claim 11, wherein:
identifying the one or more object edges includes identifying at least a set of edges that represent boundaries of a depicted surface of the object, wherein the set of edges form at least one corner; and
the feature location corresponds to the feature corresponding to an edge in the set of edges or the corner.

16. A robotic system comprising:
at least one processor; and
at least one memory device coupled to the at least one processor, the at least one memory having instructions stored thereon, that when executed by the processor, cause the processor to:
obtain a first image and a second image representative of an environment having an object located therein, wherein the first and second images use different imaging characteristics to depict the object;
based on the first image, compute an estimated location of the object;
identify one or more object edges based on analyzing the first image, wherein the identified object edges correspond to the object;
identify a feature location based on comparing the one or more object edges and the second image, the feature location representing a location of a feature in the second image that corresponds to the one or more object edges; and
generate an object detection result based on the estimated location and the feature location.

17. The robotic system of claim 16, wherein the at least one memory includes the instructions that further cause the processor to:
generate an initial object estimation based on comparing the first image to surface textures of registered objects as stored in master data, wherein the initial object estimation includes an estimated identification and the estimated location of the object;
calculate one or more detectable edge distances between corresponding pairs of the detected edges;
compare resulting detectable edge distances to dimensions of a registered object in the master data matching the estimated identification; and
select a pair of edges for a parallel edge set, wherein the pair of edges corresponds to the detectable edge distance that matches one of the dimensions of the registered object.

18. The robotic system of claim 16, wherein the at least one memory includes the instructions that further cause the processor to:
generate an edge rating for each detected edge;
wherein identifying the feature location includes comparing to the second image the object edges having the edge rating that exceed an edge detection threshold.

19. The robotic system of claim 16, wherein generating the object detection result includes updating an initial object estimation when an offset between the feature location and the one or more object edges exceeds a threshold separation distance, wherein the initial object estimation is generated based on comparing the first image to master data.

20. The robotic system of claim 16, wherein generating the object detection result includes verifying an initial object estimation when an offset between the feature location and the one or more object edges is less than a threshold separation distance, wherein the initial object estimation is generated based on comparing the first image to master data.

* * * * *